March 2, 1971  C. F. GASEK  3,566,545
TAP GRINDER
Filed Dec. 23, 1968
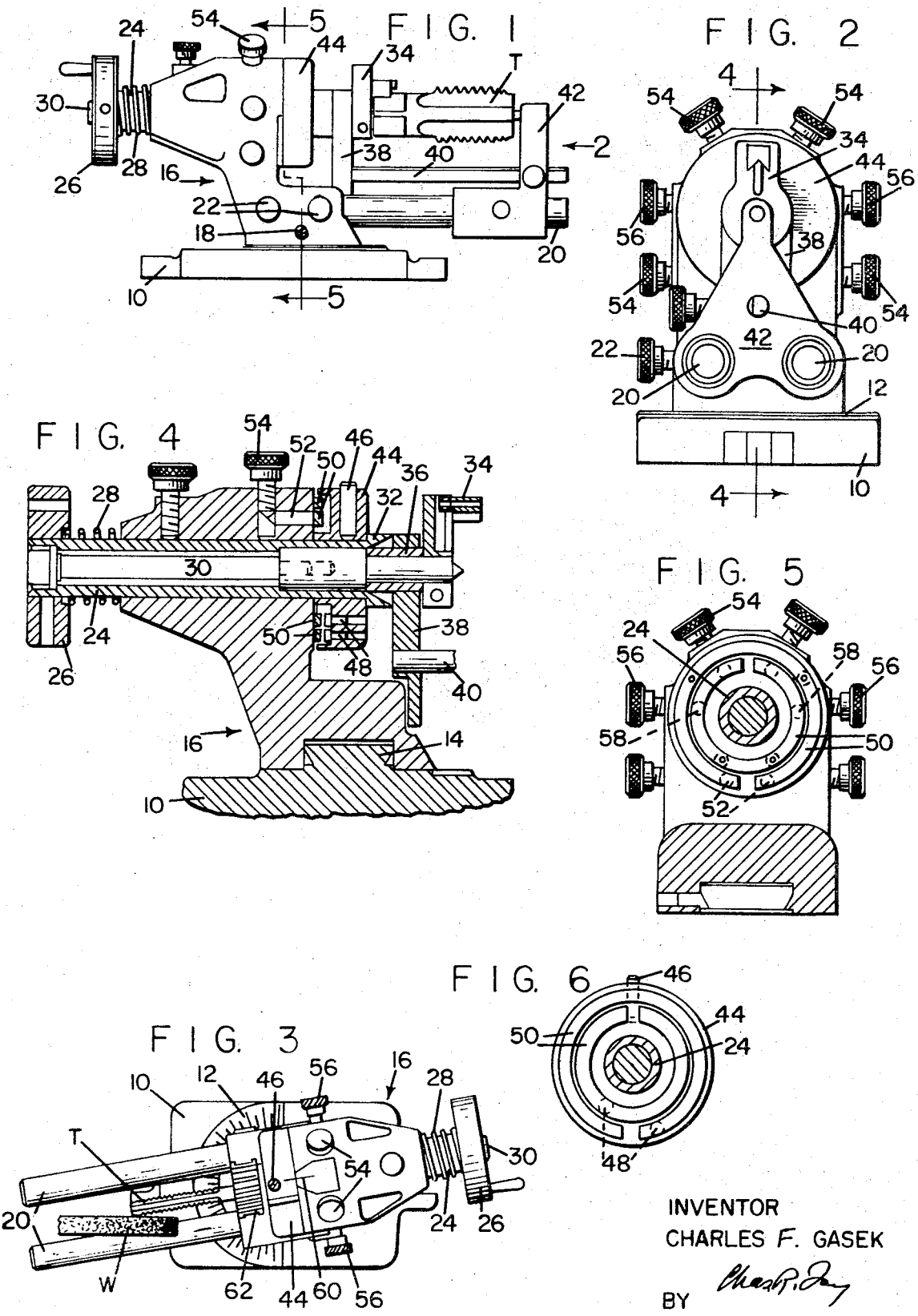
INVENTOR
CHARLES F. GASEK
BY *Charles R. Day*
ATTORNEY United States Patent Office 3,566,545
Patented Mar. 2, 1971

3,566,545
TAP GRINDER
Charles F. Gasek, North Grafton, Mass., assignor to R & A Machine Co., Inc., Worcester, Mass.
Filed Dec. 23, 1968, Ser. No. 786,295
Int. Cl. B24b 3/18, 47/02
U.S. Cl. 51—123                    3 Claims

ABSTRACT OF THE DISCLOSURE

Tap grinder comprising a collet for small taps and centers for larger taps, means to rotate the tap at an angle to a wheel, and adjustable means to automatically advance the tap to be ground and retract the tap during non-grinding periods as the tap is rotated.

BACKGROUND OF THE INVENTION

Tap grinders in the past have been limited to small taps or have been necessarily very expensive to manufacture, but with this invention a relatively inexpensive easily operated machine is provided for handling both small and large taps of two through seven flutes.

SUMMARY OF THE INVENTION

This invention presents a tap grinder that is easily portable by hand and includes a plate support, a headstock on the plate, a spindle, a hand wheel for the spindle, a series of index heads for taps of different numbers of flutes, e.g., two to seven, an index head being selectively mounted on the spindle for rotation therewith and having appropriate cam followers for contact with adjustable cams on the headstock causing the spindle to reciprocate as it is rotated, and means to hold the tap to be sharpened relative to the spindle.

A setting gauge is used to position the tap correctly rotatively and the wheel is set at the required angle for grinding. The operator turns the hand wheel, the tap is advanced and ground at the initial cutting edge, the tap retracts at the non-grinding interval, as the flute passes the wheel, and the tap once again advances for the second cutting edge to be ground, etc.

BRIEF DESCRIPTION OF THE DRAWINGS

FIG. 1 is a view in side elevation of the new tap grinder showing the center support assembly in use;

FIG. 2 is a view in front elevation looking in the direction of arrow 2 in FIG. 1;

FIG. 3 is a plan view showing the collet in use with the center support removed;

FIG. 4 is a longitudinal section on line 4—4 of FIG. 2;

FIG. 5 is a section on line 5—5 of FIG. 1, showing the cams, and

FIG. 6 is a view in elevation of an index head showing the cam followers.

PREFERRED EMBODIMENT OF THE INVENTION

The character 10 indicates a supporting plate for the grinder. This plate has slots for hold-down bolts. It has a 180° index plate 12 on it, see FIG. 3, and a circular swivel head 14, FIG. 4.

The headstock generally indicated at 16 swivels on head 14 to position it at the selected angle, see FIG. 2, and is locked in place by a swivel lock screw 18. A pair of tail stock supporting bars 20 are removably mounted to corresponding recesses in the headstock and are locked in by setscrews 22.

The headstock has a through spindle 24 having a handwheel 26 fast thereto, the spindle being mounted for reciprocation in the headstock, and is normally maintained to the left in FIGS. 1 and 4 by a spring 28. The spindle is hollow containing a two-part draw bar 30, one part extending out the forward end 32 of the spindle when in use. The draw bar rotates with the spindle and has a tap driving dog 34 removably secured to it for rotation therewith. A relatively rotary sleeve 36 on the forward part of the draw bar dependingly supports a plate 38 which carries a bar 40. The latter is horizontal and extends forwardly being adjustably secured to a tailstock 42. The tailstock is slidable on the two rods 20, 20, and has a center point for the cutting end of a tap T which is engaged by the dog 34 for rotation with the spindle.

An index head is shown at 44, see particularly FIGS. 3 and 4, and it has a central aperture to be received on the spindle being secured in position by a lock screw 46. Each index head of a set or series has a number of cam followers 48 in the form of headed pins which extend to the rear, see FIG. 4. The pins are different in number for taps of different numbers of flutes. The spindle, draw bar, index head, dog, and tap all rotate and reciprocate together.

The cams are indicated at 50, see FIGS. 4 and 5, and are strips of arcuate form, nested one within the other. Each cam is secured at its central portion to the tailstock, having its ends free. The cams are resilient and tend to remain in the same vertical plane in flat condition. Each cam has at each of its free ends a plug 52 bearing on it and actuated by a cooperating hand screw 54 to push the corresponding cam end out from the plane of the cams at rest to an adjustable degree. The cams are thus individually settable into the paths of the cam followers 48 which impinge thereon and cause reciprocation of the spindle and associated parts, together with the return action of spring 28. Knobs 56 are cam back-up members having plugs at 58 to bear on the cams when set. By making the cams as above described, the spindle can be rotated in either direction to act on either right or left-hand taps.

With the parts as in FIG. 1, the proper index head 44 is rotated against an index 60 on the headstock for proper hand and number of flutes and locked. The headstock is set to the desired chamfer angle by reference to scale 12. The proper knob for hand and flutes is then actuated for the degree of relief desired. The more the appropriate knob is advanced, the greater the relief.

The rotative position of the tap to start to be ground, at its cutting edge, is set with a gage not shown, the wheel W is positioned, see FIG. 3, and the operator then merely turns the hand wheel. A cam being struck by a cam follower moves the tap rectilinearly against the wheel, as the tap rotates, and at the end of the cut, the follower moves off the cam and spring 28 moves the tap to a retracted position as the tap rotates through the adjacent flute area, and this action repeats until all the cutters are sharpened.

For taps of about ⅝ inch and smaller, the center support assembly is removed, although not necessarily the rods 20. The drawbar is removed and a proper collet 62 screwed to the spindle. In this event the parts appear as in FIG. 2, but the operation is the same as above described.

I claim:
1. A tap grinder comprising a base, a headstock on the base, a spindle in the headstock, means to rotate the spindle, said spindle being rectilinearly reciprocable,
    a cam on the headstock, a selectively replaceable index head removably but fixedly mounted on the spindle, a cam follower in the index head in position to make contact with the cam as the spindle and index head rotate, thereby intermittently axially moving the spindle and index head as the spindle rotates, means on the spindle to hold a tap at its end opposite the cutting end thereof, means to move the spindle, index head, and tap retractively as the cam follower leaves the cam, the cam being arcuate, means to fix the cam in one portion while leaving an end free to flex, and means to adjustably flex said cam in its free end portion.

2. The tap grinder of claim 1 wherein the cam is generally arcuate and has two free ends individually adjustable for right and left-hand motion of the spindle.

3. The tap grinder of claim 1 including a second cam, both cams being arcuate and nested one within the other.

References Cited

UNITED STATES PATENTS

| | | | |
|---|---|---|---|
| 2,471,539 | 5/1949 | Parker | 51—232 |
| 2,720,731 | 10/1955 | Staat | 51—123 |
| 2,958,167 | 11/1960 | Mueller | 51—232 |

TRAVIS S. McGEHEE, Primary Examiner

U.S. Cl. X.R.

51—232